(12) United States Patent
Xiong et al.

(10) Patent No.: US 12,467,694 B2
(45) Date of Patent: Nov. 11, 2025

(54) 3D VAPOR CHAMBER

(71) Applicant: ASIA VITAL COMPONENTS CO., LTD., New Taipei (TW)

(72) Inventors: Xi-Wen Xiong, New Taipei (TW); Lei Yao, New Taipei (TW); Xing-Xing Lyu, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 233 days.

(21) Appl. No.: 18/196,416

(22) Filed: May 11, 2023

(65) Prior Publication Data
US 2024/0175638 A1 May 30, 2024

(30) Foreign Application Priority Data
Nov. 30, 2022 (TW) .................................. 111145936

(51) Int. Cl.
*F28D 15/02* (2006.01)
*F28D 15/04* (2006.01)

(52) U.S. Cl.
CPC ....... *F28D 15/0233* (2013.01); *F28D 15/046* (2013.01)

(58) Field of Classification Search
CPC ..... F28D 15/0233; F28D 15/056; F28D 15/04
USPC .................................................... 165/104.26
See application file for complete search history.

(56) References Cited

U.S. PATENT DOCUMENTS

| 5,216,580 A * | 6/1993 | Davidson | H01L 23/427 174/15.2 |
| 6,237,223 B1 * | 5/2001 | McCullough | B22F 3/1103 29/890.032 |
| 11,202,390 B2 | 12/2021 | Zhang et al. | |

(Continued)

FOREIGN PATENT DOCUMENTS

| CN | 108731526 A | * 11/2018 | ........... F28D 15/046 |
| CN | 110213940 A | 9/2019 | |

(Continued)

OTHER PUBLICATIONS

Search Report dated Jul. 7, 2023 issued by Taiwan Intellectual Property Office for counterpart application No. 111145936.

(Continued)

*Primary Examiner* — Eric S Ruppert
*Assistant Examiner* — Gustavo A Hincapie Serna
(74) *Attorney, Agent, or Firm* — Demian K. Jackson; Jackson IPG PLLC

(57) ABSTRACT

A 3D vapor chamber includes a vapor chamber and at least one pipe body. The vapor chamber has an upper plate and a lower plate mated with each other. The upper plate is formed with at least one perforation. An open end of the pipe body is outward expanded to form a lip section in connection with the upper plate. A closed end of the pipe body passes through the perforation of the upper plate. The closed end and the open end together define a tubular chamber in communication with the open end and the vapor chamber. Multiple channels formed on an inner side of the tubular chamber and an inner side of the lip section are in contact and connect with a capillary structure of the inner side of the upper plate so as to increase back flowing speed of a working fluid and enhance heat dissipation performance.

7 Claims, 4 Drawing Sheets

(56) References Cited

U.S. PATENT DOCUMENTS

| | | | |
|---|---|---|---|
| 2004/0105235 A1* | 6/2004 | Lai | F28F 1/32 |
| | | | 361/700 |
| 2005/0173098 A1* | 8/2005 | Connors | F28D 15/0233 |
| | | | 165/104.21 |
| 2007/0272399 A1* | 11/2007 | Nitta | F28D 15/046 |
| | | | 165/185 |
| 2010/0108297 A1* | 5/2010 | Chen | F28D 15/0233 |
| | | | 29/890.032 |
| 2010/0263834 A1* | 10/2010 | Hwang | F28D 15/0266 |
| | | | 165/104.26 |
| 2016/0348985 A1* | 12/2016 | Sun | F28D 15/04 |
| 2017/0227298 A1 | 8/2017 | Sun et al. | |
| 2017/0312871 A1* | 11/2017 | Lin | B23P 15/26 |
| 2017/0356694 A1* | 12/2017 | Tan | F28D 15/0266 |
| 2017/0363367 A1* | 12/2017 | Yeh | F28D 15/0266 |
| 2018/0350718 A1* | 12/2018 | Lin | H01L 21/4882 |
| 2019/0049190 A1* | 2/2019 | Liu | F28F 1/325 |
| 2019/0128617 A1* | 5/2019 | Mira | F28D 15/0275 |
| 2019/0343021 A1* | 11/2019 | Zhang | H01L 21/4882 |
| 2020/0068745 A1* | 2/2020 | Lin | H05K 7/20336 |
| 2020/0305309 A1* | 9/2020 | Zhang | F28D 15/0275 |
| 2020/0315064 A1* | 10/2020 | Agostini | H05K 7/20336 |
| 2020/0378690 A1* | 12/2020 | Liu | F28F 3/12 |
| 2021/0315130 A1* | 10/2021 | Manninen | F28D 15/0233 |
| 2022/0018609 A1* | 1/2022 | Chen | F28D 15/0275 |
| 2022/0018611 A1* | 1/2022 | Chen | H05K 7/202 |
| 2022/0163267 A1* | 5/2022 | Liu | F28F 3/06 |
| 2023/0047466 A1* | 2/2023 | Jiang | F28D 15/0266 |
| 2023/0184491 A1* | 6/2023 | Wang | F28D 15/0266 |
| | | | 165/166 |
| 2023/0213288 A1* | 7/2023 | Wang | F28F 3/02 |
| | | | 165/104.26 |
| 2023/0358482 A1* | 11/2023 | Liu | F28D 15/04 |
| 2024/0151333 A1* | 5/2024 | Liao | F28F 21/081 |
| 2024/0153845 A1* | 5/2024 | Chen | H01L 23/473 |

FOREIGN PATENT DOCUMENTS

| | | | | |
|---|---|---|---|---|
| CN | 111076583 A | * | 4/2020 | F28F 9/26 |
| CN | 112880449 A | * | 6/2021 | F28D 15/046 |
| CN | 114121847 A | | 3/2022 | |
| CN | 218998683 U | | 5/2023 | |
| TW | M523894 U | | 6/2016 | |
| TW | M630488 U | | 8/2022 | |
| TW | M638398 U | | 3/2023 | |

OTHER PUBLICATIONS

Search Report dated Apr. 18, 2025 issued by China National Intellectual Property Administration for counterpart application No. 2022115244889.

* cited by examiner

3D VAPOR CHAMBER

This application claims the priority benefit of Taiwan patent application number 111145936 filed on Nov. 30, 2022.

BACKGROUND OF THE INVENTION

1. Field of the Invention

The present invention relates generally to a 3D vapor chamber, and more particularly to a 3D vapor chamber, which can increase back flowing speed of the working fluid and enhance heat dissipation performance.

2. Description of the Related Art

The heat dissipation requirement for various electronic apparatuses (such as computers or servers) has become higher and higher so that a 3D vapor chamber (3D VC) has been developed to meet the heat dissipation requirement for various electronic apparatuses. In comparison with the conventional 2D vapor chamber, such 3D vapor chamber has the advantages of higher integrity, higher vapor spreading efficiency, smaller thermal resistance and higher heat dissipation upper limit. However, along with the increase of the integrity of the electronic apparatus such as a chip, the heat dissipation requirement is increased. The heat generation power of a high-power CPU can be up to at least 300W. Therefore, the regular heat pipe and/or vapor chamber can hardly satisfy such high-heat-flux heat dissipation requirement. As a result, the one-piece heat pipe and/or vapor chamber has been gradually replaced with the 3D vapor chamber, which has been widely applied to electronic heat dissipation field.

Please refer to FIG. 1. The conventional 3D vapor chamber 1 includes multiple heat pipes 11 and a vapor chamber 12 assembled with the heat pipes 11. The vapor chamber 12 is composed of an upper plate 121 and a lower plate 122 mated with each other. The vapor chamber 12 has a chamber 123. A working fluid is filled in the chamber 123 and a capillary structure 124 is disposed on an inner wall of the chamber 123. The upper plate 121 is formed with multiple perforations 1211 passing through the upper plate 121 in communication with the chamber 123. Multiple raised bodies 1213 protrude from the outer side of the upper plate 121. The raised bodies 1213 upward protrude from the circumferences of the perforations 1211 of the upper plate 121. Each heat pipe 11 has a closed end 111 and an upright open end 112. The open end 112 and the closed end 111 together define a heat pipe chamber 113. A heat pipe capillary structure 114 is formed on an inner wall of the heat pipe chamber 113. The open end 112 of the heat pipe 11 is plugged into the perforation 1211 of the upper plate 121, whereby the outer side of the open end 112 is securely connected with the inner side of the raised body 1213.

The conventional 3D vapor chamber 1 can satisfy the high-heat-flux heat dissipation requirement. However, there is another problem existing in the conventional 3D vapor chamber. That is, the heat pipe capillary structure 114 disposed in the heat pipe chamber 113 of the conventional heat pipe 11 is generally a sintered powder body or a woven mesh. Such capillary structure has too thick thickness so that the space in the heat pipe chamber 113 is reduced, (that is, the vapor space is minified). This leads to increase of the resistance against the flowing of the vapor working fluid from the chamber 123 into the heat pipe chamber 113. As a result, the vapor-liquid circulation efficiency is lowered.

Moreover, when the open end 112 of each heat pipe 11 is plugged and connected in the perforation 1211 of the upper plate 121, the inner side of the raised body 1213 of the upper plate 121 is mainly connected with the outer side of the corresponding heat pipe 11. However, the connection area between each heat pipe 11 and the raised body of the upper plate 121 is very small and insufficient. Therefore, the connection strength between the heat pipe 11 and the upper plate 121 of the vapor chamber 12 is insufficient. As a result, the heat pipe 11 can be hardly securely connected with the upper plate 121 of the vapor chamber 12. In this case, in manufacturing and assembling process of the heat pipe 11, it often takes place that the heat pipe 11 is detached from the vapor chamber and damaged due to collision. This will make the entire 3D vapor chamber lose its heat dissipation function. Furthermore, the heat pipe capillary structure 114 near the open end 112 is isolated (blocked) by the pipe wall of the heat pipe 11 itself and there is no capillary structure disposed on the bottom face of the open end 112. Therefore, the heat pipe capillary structure 114 is spaced from the capillary structure 124 of the inner side of the upper plate 121 without contacting or connecting with the capillary structure 124. As a result, the condensed working fluid in the heat pipe chamber 113 cannot flow and spread to the entire capillary structure 124 of the inner side of the upper plate 121. Therefore, the condensed working fluid 16 collected at the open end 112 of the heat pipe 11 can only slowly drip and flow back the evaporation section 14 of the vapor chamber 12. In this case, the back flowing speed of the working fluid is slow so that the amount of the working fluid in the evaporation section is often insufficient to cause dry burning. This will lead to poor heat dissipation performance or even failure of the 3D vapor chamber.

SUMMARY OF THE INVENTION

It is therefore a primary object of the present invention to provide a 3D vapor chamber, which can increase back flowing speed of the working fluid and enhance heat dissipation efficiency. Also, the entire 3D vapor chamber has a secure structure.

To achieve the above and other objects, the 3D vapor chamber of the present invention includes a vapor chamber and at least one pipe body. The vapor chamber has an upper plate and a lower plate. The upper plate is formed with at least one perforation passing through the upper plate. The upper plate and the lower plate are mated with each other to together define a plate-shaped chamber in communication with the perforation. A working fluid is filled in the plate-shaped chamber. A capillary structure is disposed on an inner side of each of the upper and lower plates. Two ends of the pipe body respectively have a closed end and an open end. The open end is outward expanded to form a trumpet-shaped lip section in connection with the inner side of the upper plate. The closed end passes through the perforation of the upper plate to extend out of the upper plate. The closed end and the open end together define a tubular chamber in communication with the open end and the plate-shaped chamber. Multiple channels are formed on an inner side of the tubular chamber and an inner side of the lip section. The channels of the lip section are in contact and connection with the capillary structure of the inner side of the upper plate. According to the above arrangement, the channels of the lip section of the pipe body are in contact with and mated with the capillary structure of the inner side of the upper plate or overlapped and connected with the capillary structure of the inner side of the upper plate (by way of lap joint). This not only increases the back flowing speed of the working fluid, but also enlarges the space (vapor space) in the tubular chamber so as to enhance the heat dissipation performance. In addition, the trumpet-shaped (funnel-shaped) lip section of the open end of the pipe body provides larger connection area, whereby the pipe body can be more securely and tightly connected with the upper plate so as to enhance the connection strength between the pipe body and the vapor chamber.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
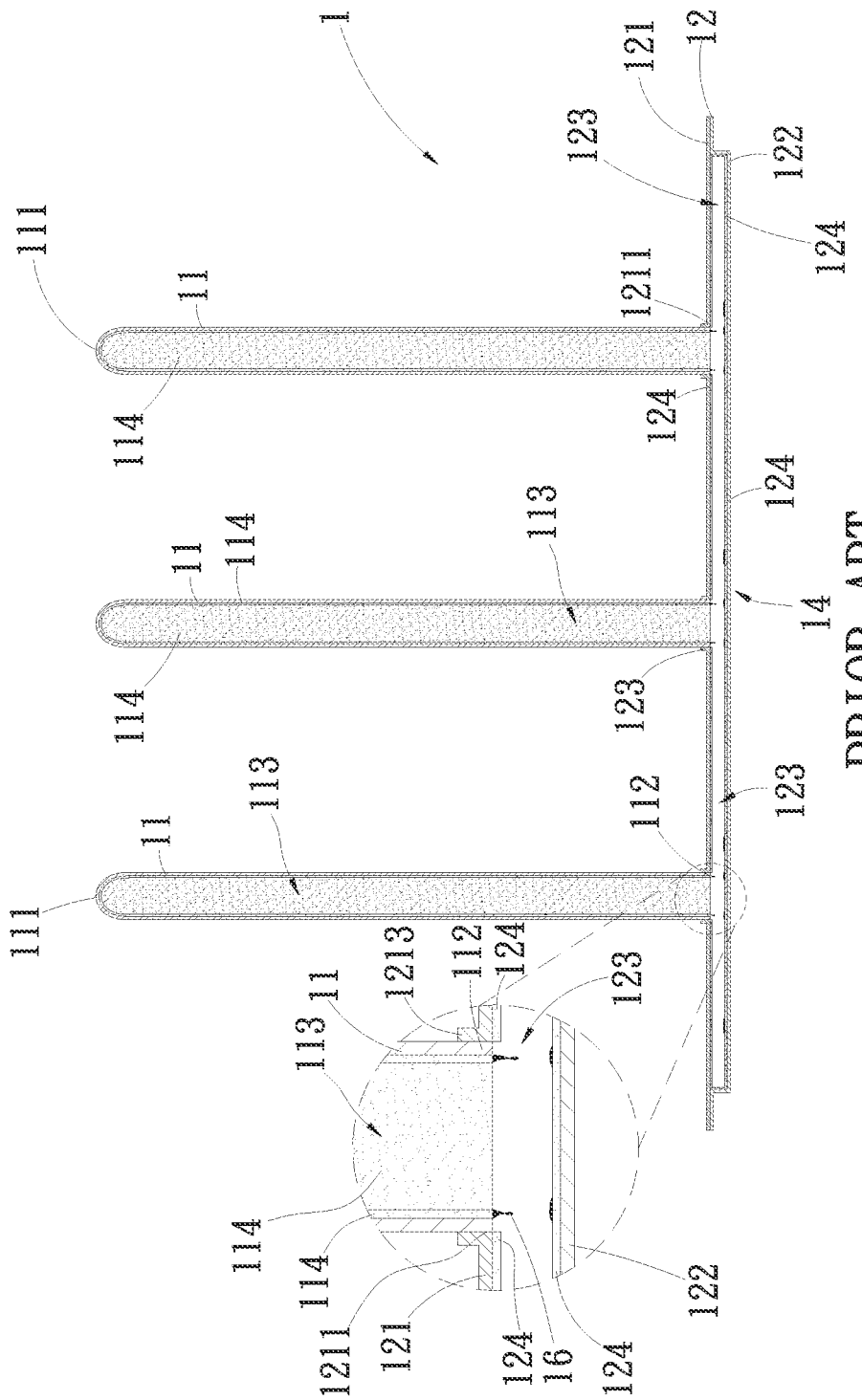
FIG. 1 is a sectional assembled view of a conventional 3D vapor chamber.
Figure 2A:
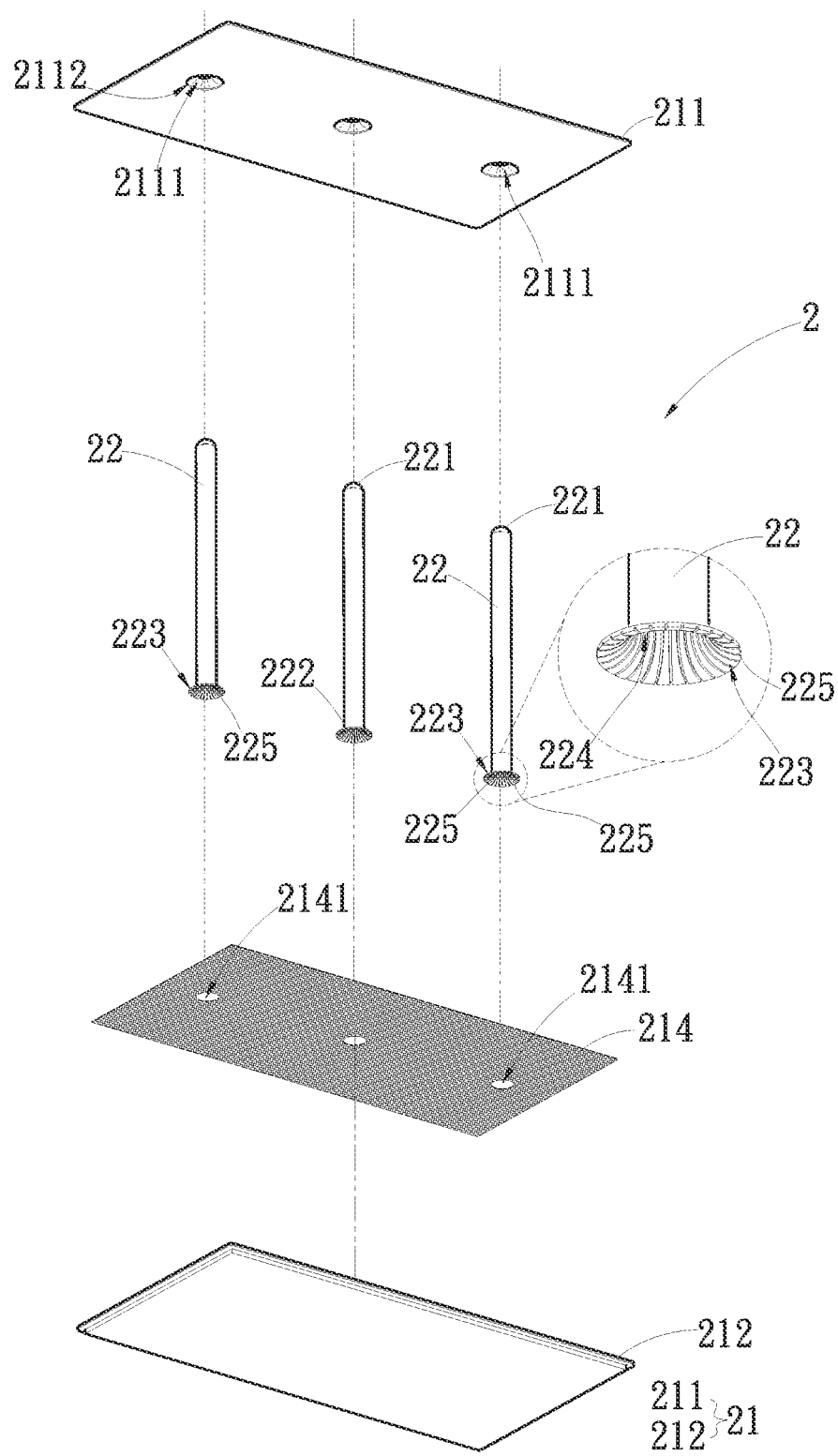
FIG. 2A is a perspective exploded view of a first embodiment of the 3D vapor chamber of the present invention.
Figure 2B:
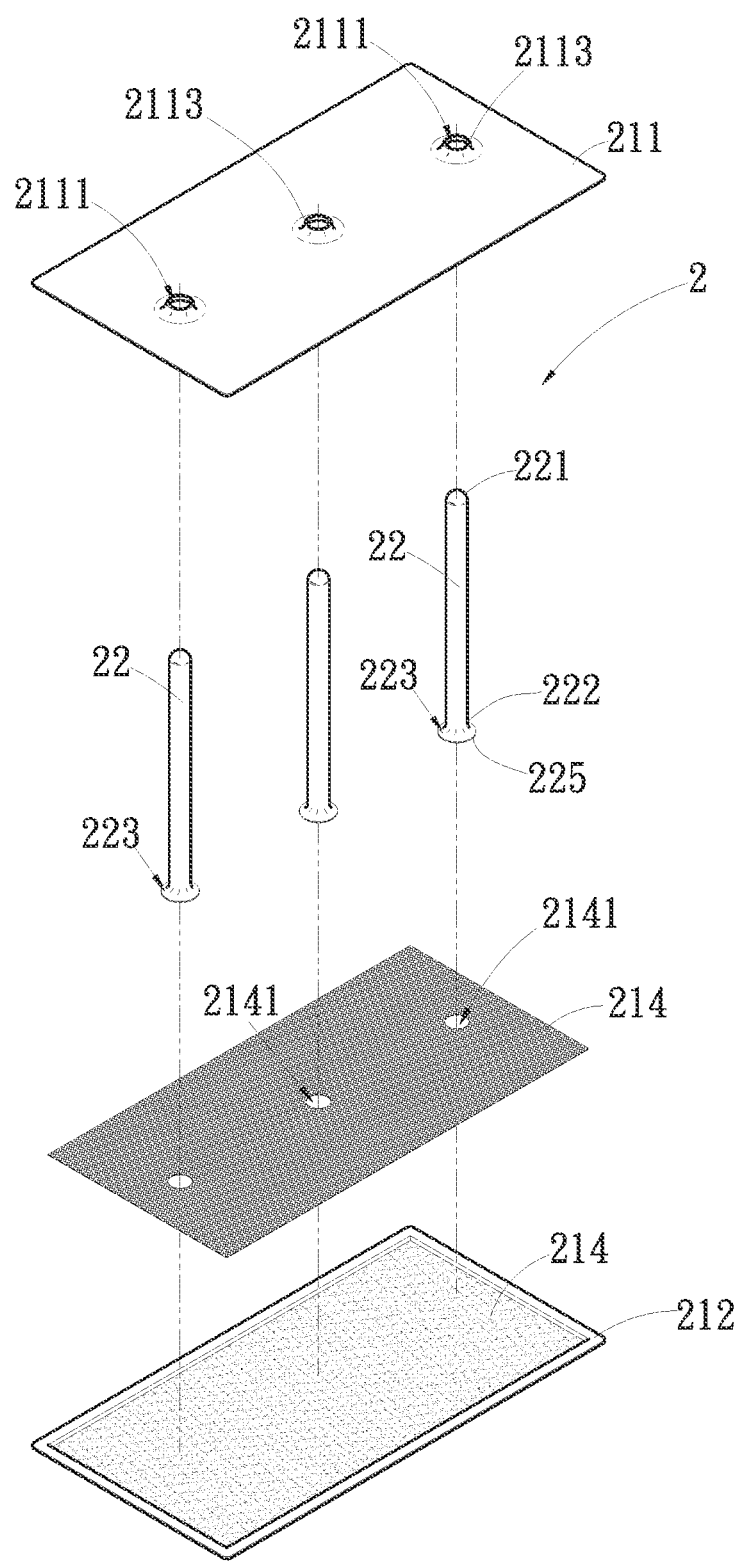
FIG. 2B is a perspective exploded view of the first embodiment of the 3D vapor chamber of the present invention, seen by another angle.
Figure 2C:
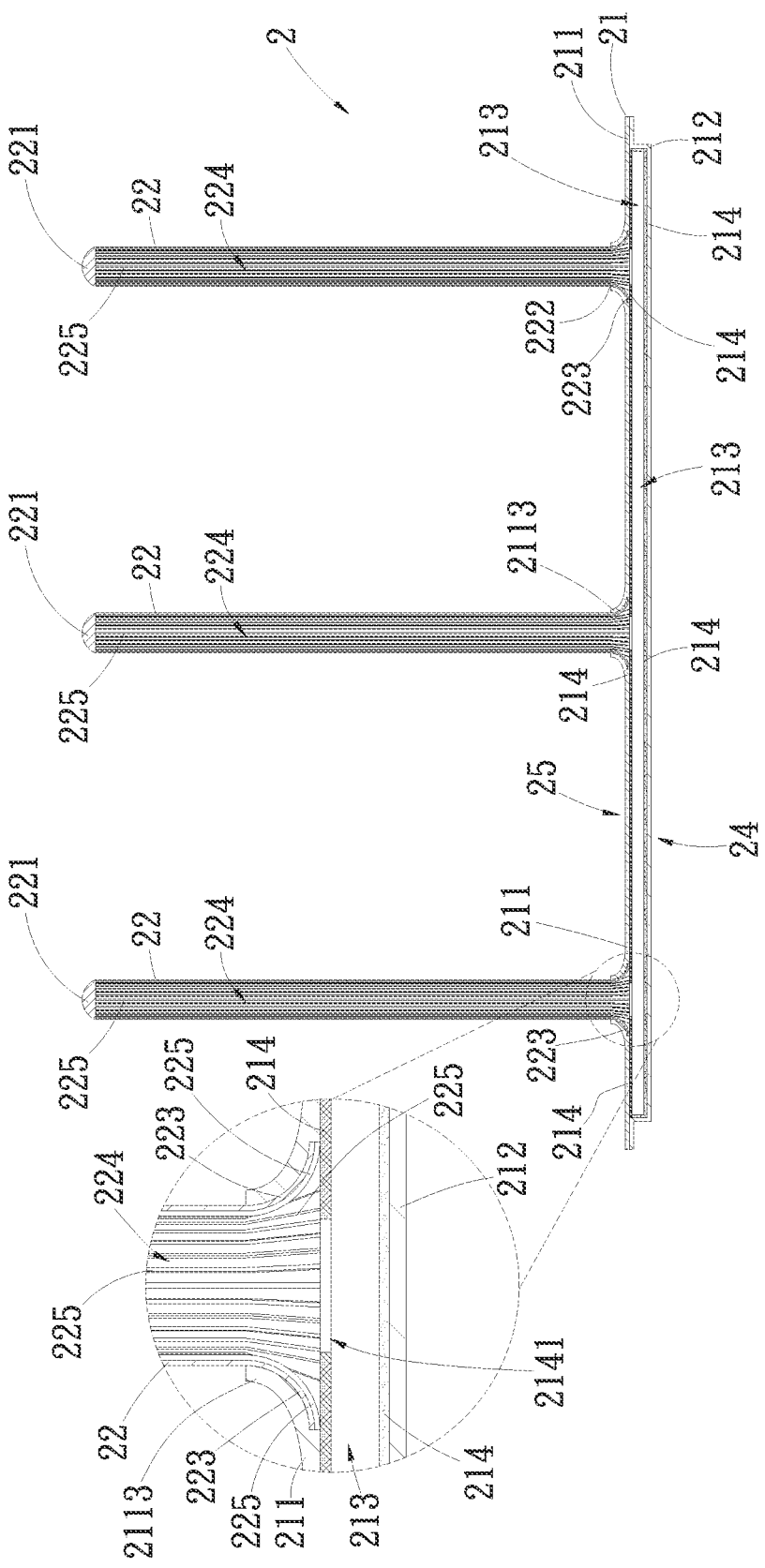
FIG. 2C is a sectional assembled view of the first embodiment of the 3D vapor chamber of the present invention.

Please refer to FIGS. 2A, 2B and 2C. The 3D vapor chamber 2 of the present invention includes a vapor chamber 21 and at least one pipe body 22. The vapor chamber 21 has an upper plate 211 and a lower plate 212. The upper plate 211 is formed with at least one perforation 2111. In this embodiment, there are multiple perforations 2111 formed on the upper plate 211 at intervals. Each perforation 2111 passes through the upper plate 211 from an outer side to an inner side of the upper plate 211. In addition, a sink 2112 is formed on the inner side of the upper plate 211 around each perforation 2111. An outer raised body 2113 is raised from the outer side of the upper plate 211 and protrudes upward (to one side) from a circumference of each perforation 2111 corresponding to the sink 2112. The upper plate 211 and the lower plate 212 are mated with each other to together define a plate-shaped chamber 213 in communication with the perforations 2111.

A working fluid is filled in the plate-shaped chamber 213 and a capillary structure 214 is disposed on the inner side of each of the upper plate 211 and the lower plate 212. The capillary structure 214 on the inner side of the upper plate 211 is formed with at least one perforation 2141 corresponding to the perforation 2111 in communication with the perforations 2111 of the upper plate 211 and the plate-shaped chamber 213. The capillary structure 214 on the inner side of the upper plate 211 in the plate-shaped chamber is different from the capillary structure 214 on the inner side of the lower plate 212 in the plate-shaped chamber 213. That is, the capillary structure 214 on the inner side of the upper plate 211 is metal woven mesh (such as copper mesh), while the capillary structure 214 on the inner side of the lower plate 212 is, but not limited to, powder sintered body. Alternatively, the capillary structure 214 on the inner side of the upper plate 211 can be identical to the capillary structure 214 on the inner side of the lower plate 212, (such as metal woven mesh (such as copper mesh), channels, powder sintered body or any combination thereof).

In this embodiment, there are multiple pipe bodies 22, which are heat pipes. The number of the pipe bodies 22 is equal to the number of the perforations 2111 of the upper plate 211. Each pipe body 22 has a closed end 221 and an open end 222 respectively positioned at two ends of the pipe body 22. The open end 222 is outward expanded to form a trumpet-shaped (or funnel-shaped) lip section 223. The closed end 221 and the open end 222 of the pipe body 22 together define a tubular chamber 224 in communication with the open end 222. In addition, multiple channels 225 are formed on an inner side of the tubular chamber 224 and an inner side of the lip section 223. The channels 225 of the tubular chamber 224 and the lip section 223 are not collinearly arranged and are connected with each other. That is, the channels 225 of the inner side of the tubular chamber 224 are axially arranged, while the channels 225 of the inner side of the lip section 223 are radially arranged in contact and connection with the channels 225 of the inner side of the tubular chamber 224.

Please further refer to FIGS. 2A, 2B and 2C. The lip section 223 of each pipe body 22 is connected with the inner side of the upper plate 211 of the vapor chamber 21. That is, the closed end 221 of each pipe body 22 passes through the perforation 2111 of the inner side of the upper plate 211 to protrude and extend out of the upper plate 211, whereby the outer raised body 2113 of the upper plate 211 is connected with the outer side of the pipe body 22 and the lip section 223 of each pipe body 22 is correspondingly received and connected in each sink 2112 of the inner side of the upper plate 211. The inner side of the lip section 223 is flush with or higher than the inner side of the upper plate 211. The tubular chamber 224 of each pipe body 22 is in communication with the plate-shaped chamber 213 through the open end 222. In addition, the channels 225 of the lip section 223 are in contact and connection with the capillary structure 214 of the inner side of the upper plate 211 (by way of such as mating or overlapping). In this embodiment, the capillary structure 214, (that is, the copper mesh), of the inner side of the upper plate 211 is overlaid on the channels 225 of the lip section 223 and connected (mated) therewith by way of overlapping. That is, the channels 225 of the lip section 223 of the pipe body 22 are overlapped with the capillary structure 214 of the upper plate 211 (by way of lap joint) and in capillary connection with the capillary structure 214 of the upper plate 211 by means of high-temperature sintering. The capillary connection means that the channels 225 of the lip section 223 are in communication with the capillary structure 214 of the inner side of the upper plate 211, whereby the capillary attraction can be transmitted or extended to the capillary structure 214 of the inner side of the upper plate 211. According to such arrangement, the channels 225 of each pipe body 22 have little flowing resistance (low condensation thermal resistance) so that the condensed working fluid sucked in the channels 225 can quickly flow and spread to the capillary structure 214 of the entire inner side of the upper plate 211 of the vapor chamber 21. Therefore, the condensed working fluid can effectively more quickly flow back to the capillary structure 214 of the lower plate 212 of the vapor chamber 21. In this case, the vapor-liquid circulation efficiency is enhanced and a full amount of working fluid can keep in the evaporation section 24 to avoid dry burning.

Moreover, the channels 225 are formed on the inner sides of the tubular chamber 224 and the lip section 223 of the pipe body 22 so that the space (vapor space) of the tubular chamber 224 is enlarged. Therefore, the flowing resistance against the vapor flowing into the tubular chamber 224 is reduced so that the vapor-liquid circulation efficiency is enhanced. Furthermore, the open end 222 of the pipe body 22 is only in adjacency to the inner side of the upper plate 211, while not extended into the plate-shaped chamber 213 to the lower plate 212. Therefore, the vapor working fluid in the plate-shaped chamber 213 can smoothly flow through the plate-shaped chamber 213 so as to effectively enhance the vapor-liquid circulation performance.

Moreover, the vapor chamber 21 and the pipe body 22 are connected with each other in such a manner that the outer raised bodies 2113 of the upper plate 211 are connected with the outer sides of the corresponding pipe bodies 22. In addition, the trumpet-shaped (funnel-shaped) lip sections 223 of the pipe bodies 22 with larger area are connected with the upper plate 211 to enlarge the connection area between the pipe bodies 22 and the upper plate 211. Accordingly, the pipe bodies 22 can be more securely and tightly connected with the upper plate 211 to enhance the connection strength between the pipe bodies 22 and the upper plate 211.

Please further refer to FIGS. 2A, 2B and 2C. The outer side of the lower plate 212 of the vapor chamber 21 serves as an evaporation section 24 attached to and in contact with a heat generation component (such as a central processing unit or a graphics processing unit, not shown). The other parts of the 3D vapor chamber 2 without contacting the heat generation component, (that is, the upper plate 211 of the vapor chamber 21 and the pipe bodies 22), are all condensation sections 25. When the evaporation section 24 of the vapor chamber 21, (that is, the outer side of the lower plate 212) contacts the heat generation component to absorb the heat thereof, the working fluid in the evaporation section 24 is heated and converted into vapor working fluid. The vapor working fluid respectively flows toward the condensation sections 25, (that is, the upper plate 211 and the pipe bodies 22). After the vapor working fluid in the upper plate 211 and the tubular chambers 224 is condensed into condensed working fluid, the channels 225 of the tubular chambers 224 will suck the condensed working fluid and make the condensed working fluid flow toward the open ends 222. Then the channels 225 of the lip sections 223 apply capillary attraction to the condensed working fluid positioned at the open ends 222 and quickly suck the condensed working fluid to flow to the capillary structure 214 of the inner side of the upper plate 211. Finally, under gravity/capillary attraction, the condensed working fluid flows back onto the evaporation section 24. Accordingly, the vapor-liquid circulation repeatedly continuously takes place to dissipate the heat.

In a modified embodiment, the channels 225 of the lip section 223 of each pipe body 22 are in contact with and mated with the capillary structure 214 of the inner side of the upper plate 211.

In still a modified embodiment, a trumpet-shaped (or funnel-shaped) connection section is formed on the outer side of the upper plate 211 in adjacency to the perforation 2111 in adaptation to the configuration of the lip section 223. The trumpet-shaped (or funnel-shaped) connection section of the perforation 2111 is connected with the trumpet-shaped (or funnel-shaped) lip section 223, whereby the connection area between the pipe body 22 and the upper plate 211 is effectively enlarged so as to more effectively enhance the connection strength between the pipe body 22 and the upper plate 211. In addition, the area (space) in the plate-shaped chamber 213 is effectively enlarged.

According to the above arrangement, the channels 225 of the lip section 223 of the pipe body 22 is overlapped with the capillary structure 214 of the upper plate 211 of the vapor chamber 21 (by way of lap joint) so that the back flowing speed of the working fluid in the pipe body is effectively increased to enhance the vapor-liquid circulation efficiency. Therefore, the heat dissipation performance of the vapor chamber is enhanced.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A 3D vapor chamber comprising:
a vapor chamber having an upper plate and a lower plate, the upper plate being formed with at least one perforation, the upper plate and the lower plate being mated with each other to together define a plate-shaped chamber in communication with the perforation, a working fluid being filled in the plate-shaped chamber and a capillary structure being disposed in the plate-shaped chamber and
at least one pipe body, two ends of the pipe body respectively having a closed end and an open end, the open end being outward expanded to form a trumpet-shaped lip section in connection with an inner side of the upper plate, the closed end passing through the perforation of the upper plate to extend out of the upper plate, the closed end and the open end together defining a tubular chamber in communication with the open end and the plate-shaped chamber, multiple channels being formed on an inner side of the tubular chamber and an inner side of the lip section, the channels of the lip section being in contact and connection with the capillary structure of the inner side of the upper plate so as to increase back flowing speed of the working fluid and enhance heat dissipation performance, wherein a diameter of a perforation on the capillary structure on the inner side of the upper plate covering a vertical projection area of the channels of the tubular chamber is smaller than an inner diameter of the pipe body.

2. The 3D vapor chamber as claimed in claim 1, wherein the channels of the tubular chamber and the lip section are not collinearly arranged and are connected with each other.

3. The 3D vapor chamber as claimed in claim 1, wherein the inner side of the lip section is flush with the inner side of the upper plate.

4. The 3D vapor chamber as claimed in claim 1, wherein the capillary structure on the inner side of the upper plate is metal woven mesh, while the capillary structure on the inner side of the lower plate is powder sintered body.

5. The 3D vapor chamber as claimed in claim 1, wherein the capillary structure on the inner side of the upper plate is different from the capillary structure on the inner side of the lower plate in the plate-shaped chamber.

6. The 3D vapor chamber as claimed in claim 1, wherein the channels of the lip section cover the capillary structure of the inner side of the upper plate with ends of the channels of the lip section overlapping and connecting with the capillary structure.

7. A 3D vapor chamber comprising:
a vapor chamber having an upper plate and a lower plate, the upper plate being formed with at least one perforation, the upper plate and the lower plate being mated with each other to together define a plate-shaped chamber in communication with the perforation, a working fluid being filled in the plate-shaped chamber and a capillary structure being disposed in the plate-shaped chamber, and at least one pipe body, two ends of the pipe body respectively having a closed end and an open end, the open end being outward expanded to form a trumpet-shaped lip section in connection with an inner side of the upper plate, the closed end passing through the perforation of the upper plate to extend out of the upper plate, the closed end and the open end together defining a tubular chamber in communication with the open end and the plate-shaped chamber, multiple channels being formed on an inner side of the tubular chamber and an inner side of the lip section, the channels of the lip section being in contact and connection with the capillary structure of the inner side of the upper plate so as to increase back flowing speed of the working fluid and enhance heat dissipation performance, wherein the channels of the lip section cover the capillary structure of the inner side of the upper plate with ends of the channels of the lip section overlapping and connecting with the capillary structure.

\* \* \* \* \*